(12) United States Patent
Zhang

(10) Patent No.: US 10,791,184 B2
(45) Date of Patent: Sep. 29, 2020

(54) INFORMATION PRESENTATION METHOD AND APPARATUS

(71) Applicant: Alibaba Group Holding Limited, George Town (KY)

(72) Inventor: Yueguang Zhang, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/419,842

(22) Filed: May 22, 2019

(65) Prior Publication Data

US 2019/0273788 A1 Sep. 5, 2019

Related U.S. Application Data

(63) Continuation of application No. PCT/CN2017/112615, filed on Nov. 23, 2017.

(30) Foreign Application Priority Data

Nov. 30, 2016 (CN) .......................... 2016 1 1078110

(51) Int. Cl.
*H04L 29/08* (2006.01)
*G06F 9/451* (2018.01)
*H04M 1/725* (2006.01)

(52) U.S. Cl.
CPC ............ *H04L 67/18* (2013.01); *G06F 9/454* (2018.02); *H04L 67/22* (2013.01); *H04M 1/72569* (2013.01); *H04M 1/72572* (2013.01)

(58) Field of Classification Search
CPC ..................................................... H04L 29/08

USPC ......................................................... 707/805
See application file for complete search history.

(56) References Cited

U.S. PATENT DOCUMENTS

| 2004/0043758 | A1* | 3/2004 | Sorvari | ............ | H04M 1/72561 |
| | | | | | 455/414.1 |
| 2008/0276182 | A1 | 11/2008 | Leow | | |
| 2009/0055749 | A1 | 2/2009 | Chatterjee et al. | | |

(Continued)

FOREIGN PATENT DOCUMENTS

| CN | 105430077 | 3/2016 |
| CN | 105471720 | 4/2016 |

(Continued)

OTHER PUBLICATIONS

International Preliminary Report on Patentability in International Patent Application No. PCT/CN2017/112615, dated Jun. 4, 2019, 10 pages (with English Translation).

(Continued)

*Primary Examiner* — Syling Yen
(74) *Attorney, Agent, or Firm* — Fish & Richardson P.C.

(57) ABSTRACT

In an implementation, providing service information is described. Current scenario information of a client device is obtained by a server and from a client device. Service information matching the current scenario information of the client device is obtained by the server, where the service information is associated with a plurality of services. The service information is returned by the server and to the client device, where the client device displays the service information in a specified interface using a visualization template, and where the service information includes at least one of access information or an interface of an application.

20 Claims, 8 Drawing Sheets

(56) References Cited

U.S. PATENT DOCUMENTS

| | | | | |
|---|---|---|---|---|
| 2014/0195664 | A1* | 7/2014 | Rahnama | H04W 4/70 |
| | | | | 709/223 |
| 2016/0241497 | A1 | 8/2016 | Yuan et al. | |
| 2016/0321222 | A1 | 11/2016 | Greenberg et al. | |
| 2017/0033987 | A1* | 2/2017 | Bush | H04L 41/0889 |
| 2018/0026733 | A1* | 1/2018 | Yang | H04N 21/4882 |
| | | | | 725/33 |

FOREIGN PATENT DOCUMENTS

| | | |
|---|---|---|
| CN | 105589975 | 5/2016 |
| CN | 105992171 | 10/2016 |
| CN | 106126308 | 11/2016 |
| CN | 106155754 | 11/2016 |
| CN | 107040648 | 8/2017 |
| EP | 1971118 | 9/2008 |
| TW | 201602816 | 1/2016 |
| TW | 201636811 | 10/2016 |

OTHER PUBLICATIONS

International Search Report and Written Opinion in International Application No. PCT/CN2017/112615, dated Feb. 7, 2018, 15 pages (with English Translation).
European Extended Search Report in European Patent Application No. 17877139.0, dated Jul. 29, 2019, 11 pages.
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.

* cited by examiner

INFORMATION PRESENTATION METHOD AND APPARATUS

CROSS-REFERENCE TO RELATED APPLICATIONS

This application is a continuation of PCT Application No. PCT/CN2017/112615, filed on Nov. 23, 2017, which claims priority to Chinese Patent Application No. 201611078110.5, filed on Nov. 30, 2016, and each application is hereby incorporated by reference in its entirety.

TECHNICAL FIELD

The present application relates to the field of computer software technologies, and in particular, to an information presentation method and apparatus.

BACKGROUND

With popularization of mobile end-user devices, various applications on the mobile end-user devices also explosively increase. Most applications generally provide only one specific service such as news browsing, foreign language learning, or photo editing.

In the existing technology, when a user needs a certain service, the user can browse a desktop of a mobile end-user device to search for an application icon corresponding to the service. If the user can find the application icon, the user can click it, to open a corresponding application service interface.

However, when there are many application icons on the desktop, the user possibly needs to perform relatively cumbersome operations such as page turning, icon folder opening, and fuzzy retrieval, to search for the application icon corresponding to the needed service, and applications corresponding to the application icons on the desktop do not necessarily provide the service needed by the user. It can be seen that in the existing technology, it is inconvenient for the user to obtain services.

SUMMARY

Implementations of the present application provide an information presentation method and apparatus, so as to alleviate a problem in the existing technology that it is less convenient for a user to obtain services.

To alleviate the previously described technical problem, the implementations of the present application are implemented as follows:

An implementation of the present application provides an information presentation method, including: sending, by a client device, current scenario information of the client device to a server; obtaining service information of a plurality of services returned by the server, where the service information is obtained by the server by matching the current scenario information; and displaying the service information in a specified interface by using a visualization template; where the service information includes access entry information of an application and/or an application interface of an application.

An implementation of the present application provides another information presentation method, including: obtaining, by a server, current scenario information of a client device; obtaining service information of a plurality of services by matching the current scenario information; and returning the service information to the client device, so that the client device displays the service information in a specified interface by using a visualization template; where the service information includes access entry information of an application and/or an application interface of an application.

An implementation of the present application provides an information presentation apparatus, where the apparatus is located on a client device, and includes the following: a sending module, configured to send current scenario information of the client device to a server; an acquisition module, configured to obtain service information of a plurality of services returned by the server, where the service information is obtained by the server by matching the current scenario information; and a display module, configured to display the service information in a specified interface by using a visualization template; where the service information includes access entry information of an application and/or an application interface of an application.

An implementation of the present application provides an information presentation apparatus, where the apparatus is located on a server, and includes the following: a first acquisition module, configured to obtain current scenario information of a client device; a second acquisition module, configured to obtain service information of a plurality of services by matching the current scenario information; and a returning module, configured to return the service information to the client device, so that the client device displays the service information in a specified interface by using a visualization template; where the service information includes access entry information of an application and/or an application interface of an application.

The previously described at least one technical solution used in the implementations of the present application can achieve the following beneficial effects: A scenario that a user is located in can be speculated based on the current scenario information of the client device, the service information of the plurality of services that the user possibly needs in the scenario is obtained, and the service information is displayed to the user by using the visualization template, so that the user obtains a corresponding service based on the displayed service information. The service information includes the access entry information of the application and/or the application interface of the application. Therefore, it is more convenient for the user to obtain services, and some or all problems in the existing technology can be alleviated.

BRIEF DESCRIPTION OF DRAWINGS

To describe the technical solutions in the implementations of the present application or in the existing technology, the following briefly describes the accompanying drawings for describing the implementations or the existing technology. Apparently, the accompanying drawings in the following description show some implementations of the present application, and a person of ordinary skill in the art can still derive other drawings from these accompanying drawings without creative efforts.

DESCRIPTION OF IMPLEMENTATIONS

Implementations of the present application provide an information presentation method and apparatus.

To make a person skilled in the art understand the technical solutions in the present application better, the following describes the technical solutions in the implementations of the present application with reference to the accompanying drawings in the implementations of the present application. Apparently, the described implementations are merely some but not all of the implementations of the present application. All other implementations obtained by a person of ordinary skill in the art based on the implementations of the present application without creative efforts shall fall within the protection scope of the present application.

A core idea of the present application is as follows: A scenario that a user is currently located in is speculated based on current scenario information of a client device of the user, service information of a plurality of services (the user possibly needs these services in the scenario) applicable to the scenario is obtained, and the service information is flexibly displayed to the user on the client device by using a visualization template such as a card, so that the user obtains a corresponding service by using the service information, and it is more convenient for the user to obtain services.

The following describes the solutions of the present application in detail.

During specific implementation, the solutions of the present application can relate to actions on a client device and a server. It is worthwhile to note that the "server" is a general term of software and hardware that are located on a peer end of the client device and that can serve the client device, and the software and hardware are not necessarily located in a same device or a same system.

Figure 1:
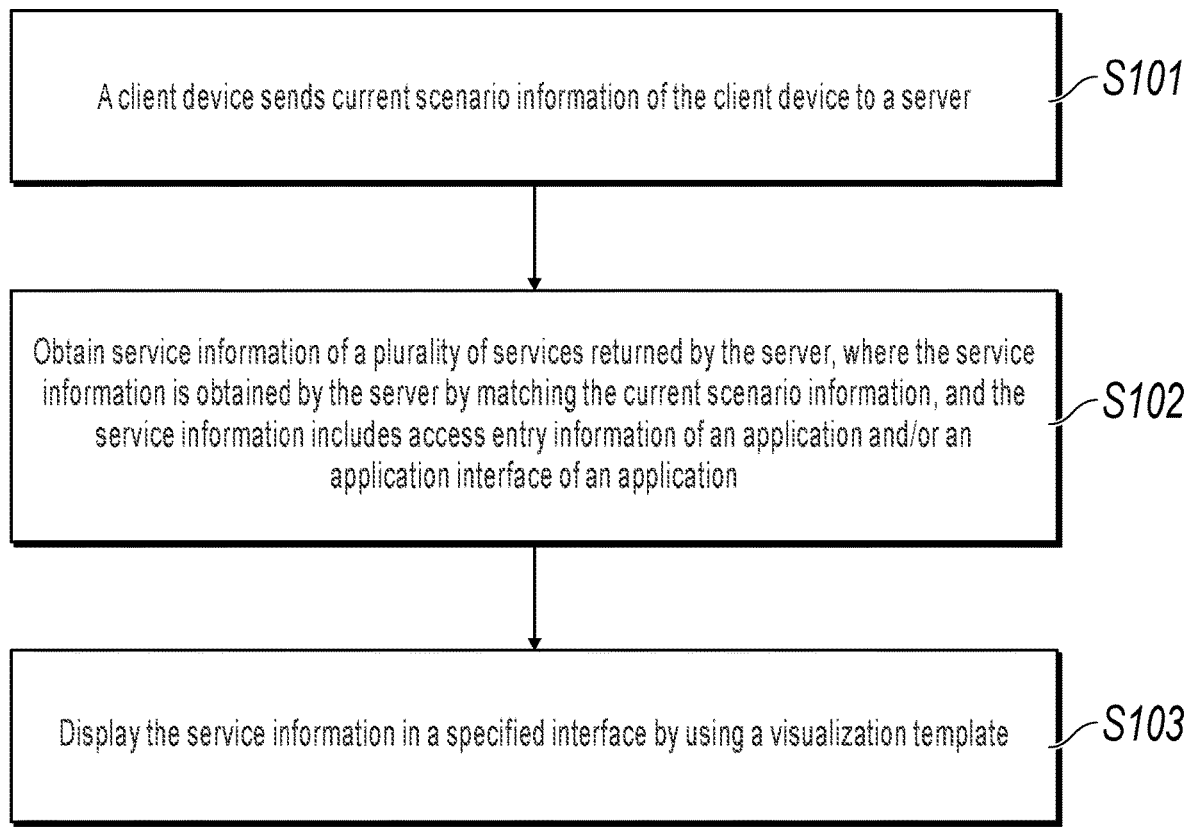
FIG. 1 is a schematic flowchart illustrating an information presentation method, according to an implementation of the present application.

FIG. 1 is a schematic flowchart illustrating an information presentation method, according to an implementation of the present application. From a perspective of software, an execution body of the procedure is a client device. From a perspective of a device, an execution body of the procedure can include but is not limited to the following devices that can include a client device: a mobile phone, a tablet computer, a smartwatch, a vehicle, a personal computer, a large and medium-sized computer, a computer cluster, etc. By using the mobile phone as an example, the client device can be a certain application on the mobile phone.

The procedure in FIG. 1 can include the following steps.

S101. A client device sends current scenario information of the client device to a server.

In this implementation of the present application, the current scenario information can directly or indirectly reflect a scenario that the client device is currently located in.

Specifically, the current scenario information can be information reflecting an environment that the client device is located in, for example, geographical location information, weather information, and human activity information of a location that the client device is located in. Alternatively, the current scenario information can be information reflecting an operation performed on a device that the client device is located in, for example, usage information and setting information of another application on the client device or on the device that the client device is located in. The current scenario information can be obtained by the client device from any program on the device that the client device is located in, or can be obtained from a network.

In this implementation of the present application, the current scenario information can be included in a service information acquisition request and then sent to the server.

S102. Obtain service information of a plurality of services returned by the server, where the service information is obtained by the server by matching the current scenario information, and the service information includes access entry information of an application and/or an application interface of an application.

In this implementation of the present application, after receiving the current scenario information sent by the client device, the server can match the current scenario information against predetermined scenario content information, to speculate a scenario that a user of the client device is located in, obtain service information of a plurality of services applicable to the scenario, and return the service information to the client device.

Scenario content information matched against the current scenario information and the current scenario information have a same type or are related; otherwise, a matching result is meaningless. For example, if the current scenario information is geographical location information, the scenario content information matched against the current scenario information can also be geographical location information (or identification information related to the geographical location information, for example, food information and human activity information that can reflect the geographical location). When a deviation between a geographical location corresponding to the current scenario information and a geographical location corresponding to the scenario content information does not exceed a determined threshold, it can be considered that the two pieces of information successfully match.

In this implementation of the present application, the service information can be obtained without matching the scenario content information, but by directly matching the service information. The following implementation is still described by mainly using an idea that the service information is obtained by matching the scenario information of the client device against the scenario content information of the server.

In this implementation of the present application, the service information of "the plurality of services" needs to be returned. This is because in practice, even if a scenario that a user is located in is speculated, it is difficult to accurately determine that the user certainly needs to use a certain service, and only a service (including the plurality of services) that the user possibly uses can be speculated. Therefore, compared with returning service information of only one service, it is more likely that returning the service information of the plurality of services satisfies a user need. In addition, a need for the service information of each of the plurality of services to satisfy the user need can be reduced, which is conducive to improving fault tolerance of the solutions in the present application.

In the present application, a specific quantity of services is not limited. An excessively large quantity of service possibly causes a burden to the client device, and is not conducive to user selection. Therefore, an appropriate quantity of services can be determined based on an actual condition. Therefore, it is better that the plurality of services are different services (because only one of two services that are the same or similar is usually used by the user), so as to help reduce the quantity of services.

In this implementation of the present application, the server can return the service information in a plurality of methods, and several methods are lists as examples.

In a first method, the server only returns the service information of the plurality of services, and does not interfere with how the client device displays the service information.

In a second method, the server integrates the service information and a visualization template, and returns integrated information to the client device, and the client device only needs to display the received information.

In a third method, the server returns the service information and template indication information together or separately to the client device, and the client device displays the service information by using a visualization template indicated by the template indication information.

In this implementation of the present application, if there is no scenario information on the server that can be successfully matched with the current scenario information, the server possibly returns no service information or returns some default service information, and can return corresponding prompt information to the client device.

In this implementation of the present application, the service information can be access entry information of an application (for example, a hyperlink of an application interface or an application start shortcut corresponding to a service), and/or an application interface of an application. The application can be an independent third-party application, or can be at least some built-in applications integrated into the client device. Certainly, on this basis, the service information can further include some other information such as advertisements or instruction information. An application corresponding to the service information can provide a service corresponding to the service information.

S103. Display the service information in a specified interface by using a visualization template.

In this implementation of the present application, the visualization template can be in a plurality of styles, for example, a card-style template and an icon-style template. Specific styles can be different, and the specific style includes but is not limited to a size, a shape, a color, a texture, a shadow, a pattern, etc.

In this implementation of the present application, the current scenario information of the client device can be different at different times as described above. Therefore, the procedure in FIG. 1 is usually performed more than once. For example, because the scenario that the user of the client device is located in changes many times in a period of time, the procedure is also possibly performed many times.

According to the method in FIG. 1, the scenario that the user is located in can be speculated based on the current scenario information of the client device, the service information of the plurality of services that the user possibly needs in the scenario is obtained, and the service information is displayed to the user by using the visualization template, so that the user obtains a corresponding service based on the displayed service information. The service information includes the access entry information of the application and/or the application interface of the application. Therefore, it is more convenient for the user to obtain services, and some or all problems in the existing technology can be alleviated.

Based on the method in FIG. 1, this implementation of the present application further provides some specific implementation solutions and extension solutions of the method, which are described below.

In this implementation of the present application, that a client device sends current scenario information of the client device to a server in step S101 can include the following: The client device sends the current scenario information of the client device to the server when the client device is started or a specified interface is refreshed. Alternatively, the client device can send the current scenario information of the client device to the server when detecting that the current scenario information changes; or the client device regularly sends the current scenario information of the client device to the server, etc.

The specified interface can be an interface subsequently used by the client device to display service information.

In this implementation of the present application, the current scenario information can include the information reflecting the environment that the client device is located in as described above. In practice, geographical location information is important information reflecting an environment, and is easily obtained. Considering costs, the geographical location information can be used in a specific implementation solution of the solutions of the present application.

In this case, the information reflecting the environment that the client device is located in can be global positioning system (GPS) positioning information of the device that the client device is located in, and/or information about Wireless Fidelity (WiFi) connected to the device that the client device is located in. The geographical location information of the client device can be directly or indirectly obtained based on the information (for example, by parsing the information by using a location service). In this case, the service information is obtained by the server by matching the information reflecting the environment that the client device is located in against predetermined geographical location information, and the service information corresponds to successfully matched geographical location information.

Further, the service information of the plurality of services that corresponds to the geographical location information can be service information applicable to a service used by the user in the geographical location. Correspondingly, when being in the geographical location, the user possibly needs to use the service.

For example, when a user in a country A travels to a country B, the user possibly needs a monetary exchange rate conversion service, a traffic information service in the country B, etc. when being in the country B.

In addition to the geographical location information, other information that can reflect the environment can also be used as the current scenario information, for example, weather information. Assume that the weather information obtained from the client device is snow, the successfully matched scenario information can also be the snow information, and a service corresponding to the snow information can be a traffic information service (the snow easily causes traffic congestion, and therefore the user possibly needs the traffic information service) or a facility guide service on snowy days (for example, a service for prompting where to install a tire chain for the vehicle or a service for calling a snow clearer).

In this implementation of the present application, as described above, the current scenario information can also include the information reflecting the operation performed on the device that the client device is located in, for example, usage information and setting information of another application on the client device or on the device that the client device is located in.

By using the usage information as an example, the usage information is usually generated because the user performs an operation on the device that the client device is located in, and the user starts a certain application on the device, performs service interaction by using a certain application, etc. The scenario that the user is located in can also be speculated based on the usage information.

For example, when the current scenario information is information that the user uses a train ticket reservation service, the service information of the plurality of services on the server that corresponds to scenario information successfully matched with the information can be hotel service information of a destination city for which the user reserves a train ticket, hot spot service information, etc. This is because the user possibly needs to continue to reserve a destination hotel, query a destination scenic spot, etc. after reserving the train ticket.

In this implementation of the present application, the service information of the plurality of services returned by the server can be obtained from each predetermined service provider, and the predetermined service provider can be a service provider of the server, or can be a third-party service provider (for example, a service provider of an external application).

The service provider can further actively provide corresponding scenario content information while providing the service information. In this case, a correspondence between the service information and the scenario content information is actually determined by the service provider. Certainly, the correspondence can also be determined by the server. In this case, the server can determine the corresponding scenario content information based on the service information provided by each service provider.

In practice, the service information provided by the service provider, and/or the scenario content information, and/or the correspondence between the two pieces of information are/is not necessarily reliable. To prevent such uncertainty from causing poor experience to the user, the information provided by the service provider can be mechanically or manually audited in advance on the server, and can be used in a subsequent procedure only after the auditing succeeds.

For example, the correspondence between the service information and the successfully matched scenario content information is determined based on the following mechanical or manual determination result: A service corresponding to the service information is applicable to a scenario corresponding to the successfully matched scenario information. The determination result can be obtained through the previously described auditing, or can be directly obtained by using the correspondence provided by the service provider. The term "applicable to" is usually described by analyzing service usage habits of many users based on big data or experience. This is not limited in the present application.

In this implementation of the present application, the server can further return template indication information to the client device as described above. In this case, before the displaying the service information in a specified interface by using a visualization template in step S103, the procedure can further include the following: obtaining, by the client device, template indication information returned by the server.

Correspondingly, the displaying the service information in a specified interface by using a visualization template can include the following: displaying the service information in the specified interface by using a visualization template indicated by the template indication information.

An example that the server returns the service information together with the template indication information is used. The server can represent the service information and the template indication information in a form of a character string JSON or a character string XML, and then return the character string to the client device. The character string includes a plurality of predetermined fields and field values determined based on the service information, and the character string reflects the service information and a visualization template that should be used to display the service information.

In this implementation of the present application, the client device can add all service information returned by the server in a same visualization template for display, or can separately add each of all service information in one visualization template for display.

By using a card-style visualization template as an example, all the service information returned by the server can be added to a same "card" for display in the former case, and service information of each service can be added to one "card" for display and the cards are simultaneously displayed by using a certain layout in the latter case. The former display mode has the following advantage: Each card corresponds to one scenario, so as to facilitate unified management and display. The latter display mode has the following advantage: When the scenario that the client device is located in changes, it is convenient to independently process one or more pieces of service information (for example, only to modify a certain card or delete a certain card) in a unit of a card, which helps to reduce impact on an entire display pattern, and further helps to reduce a processing burden of the client device.

In addition to the card-style visualization template, an icon-style visualization template, a three-dimensional graph-style visualization template, etc. are also applicable to the solutions of the present application. Details are omitted here for simplicity.

In this implementation of the present application, a method used by the user to obtain a service based on the displayed service information varies with a specific form of the service information.

When the service information includes the access entry information of the application, the user further needs to perform an access operation, to obtain the corresponding service. Specifically, after the displaying the service information in a specified interface by using a visualization template, the procedure can further include the following: when detecting a specified operation performed on the displayed visualization template that includes the access entry information of the application, displaying, by the client device, an application interface of an application corresponding to the service information, or invoking another client, so that the another client displays the application interface of the application corresponding to the service information. Further, the user can obtain the service by using a service interface.

The specified operation can be a click operation, a press operation, etc. performed on an area displayed by the access entry information.

In this implementation of the present application, the scenario that the client device is located in possibly changes as described above. Therefore, the service information included in the visualization template displayed on the client device should not remain unchanged. The service information can change in at least the following two methods:

In a first method, at least a part of the service information displayed on the client device is replaced and updated by performing the procedure in FIG. 1.

In a second method, the client device and/or the server detect/detects changed current scenario information of the client device, and when determining that the changed current scenario information cannot be successfully matched with the previously successfully matched scenario content information, the client device and/or the server can delete or hide at least a part of the currently displayed visualization template that includes the service information.

By using the card-style visualization template as an example, from a perspective of a user, the client device possibly displays a new card (the server pushes the new card) and deletes or hides a previous card (the server withdraws the previous card) after the scenario that the user is located in changes. In this case, the user can conveniently obtain a plurality of services applicable to a current scenario as the scenario changes, which brings scenario immersion service experience to the user. "Scenario immersion" for the user usually means that the client device of the user knows a scenario that the user is currently located in, services that the user possibly needs, and service information of these services is accurately provided to the user in time.

The procedure in FIG. 1 is mainly described from a perspective of a client device. An implementation of the present application further provides a procedure described from a perspective of a server, and the procedure corresponds to the procedure in FIG. 1, which is shown in FIG. 2.

Figure 2:
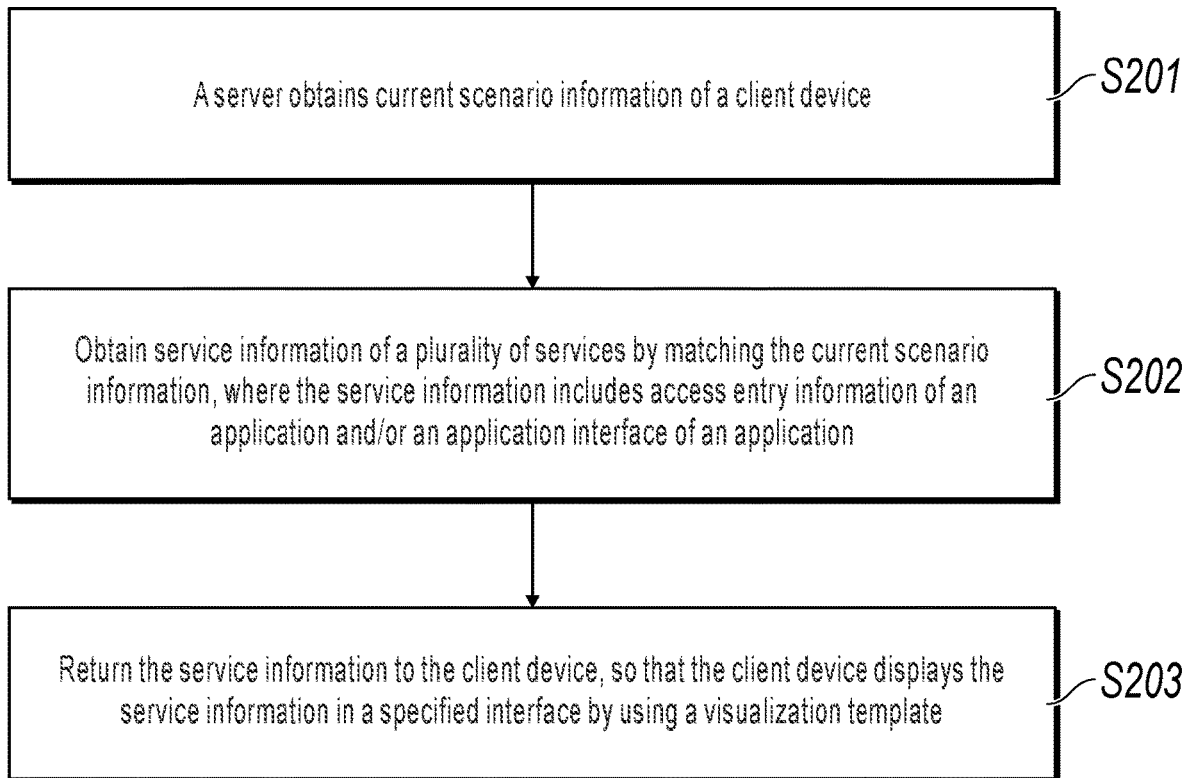
FIG. 2 is a schematic flowchart illustrating another information presentation method that corresponds to FIG. 1, according to an implementation of the present application.

FIG. 2 is a schematic flowchart illustrating another information presentation method that corresponds to FIG. 1, according to an implementation of the present application. From a perspective of software, an execution body of the procedure is a server. From a perspective of a device, an execution body of the procedure can include but is not limited to the following devices (which are usually used as a server in this case) that can include a server: a mobile phone, a tablet computer, a smartwatch, a vehicle, a personal computer, a large and medium-sized computer, a computer cluster, etc.

The procedure in FIG. 2 can include the following steps.

S201. A server obtains current scenario information of a client device.

S202. Obtain service information of a plurality of services by matching the current scenario information, where the service information includes access entry information of an application and/or an application interface of an application.

S203. Return the service information to the client device, so that the client device displays the service information in a specified interface by using a visualization template.

According to the method in FIG. 2, a scenario that a user is located in can be speculated based on the current scenario information of the client device, the service information of the plurality of services that the user possibly needs in the scenario is obtained, and the service information is displayed to the user by using the visualization template, so that the user obtains a corresponding service based on the displayed service information. The service information includes the access entry information of the application and/or the application interface of the application. Therefore, it is more convenient for the user to obtain services, and some or all problems in the existing technology can be alleviated.

Because some actions of the server in the solutions of the present application have been described in detail above, supplementary descriptions are mainly provided here, and repeated content is omitted or merely simply described.

In this implementation of the present application, the obtaining service information of a plurality of services by matching the current scenario information in step S202 can include the following: matching the current scenario information against predetermined scenario content information, to determine successfully matched scenario content information; and obtaining the service information of the plurality of services that corresponds to the successfully matched scenario content information.

In this implementation of the present application, before the obtaining service information of a plurality of services by matching the current scenario information in step S202, the procedure can further include the following: obtaining, by using a predetermined interface, the following information sent by each predetermined service provider: service information of a service that can be provided by the service provider and geographical location information corresponding to the service information, where the obtained geographical location information is used as scenario content information corresponding to the service information. In this case, the current scenario information obtained from the client device can be the geographical location information.

In this implementation of the present application, the procedure in FIG. 2 can further include the following: returning, by the server, template indication information to the client device, so that the client device displays the service information in the specified interface by using a visualization template indicated by the template indication information.

In this implementation of the present application, each piece of scenario information of the server possibly corresponds to a plurality of pieces of service information of services, and a same service that can be provided by a plurality of service providers can correspond to a plurality of pieces of service information. In practice, it is unrealistic to return all service information corresponding to scenario information that matches the current scenario information of the client device to the client device. This is because there are many redundant services, and consequently processing burdens of the client device and the server are excessively large. Corresponding measures are also provided in the solutions of the present application for this problem, which are described below.

Specifically, the obtaining the service information of the plurality of services that corresponds to the successfully matched scenario content information in step S202 can include the following: obtaining service information of at least some of all services corresponding to the successfully matched scenario content information; and performing, based on a predetermined integration rule and/or filtering rule, integration and/or filtering on the service information of the at least some services corresponding to the successfully matched scenario content information, to obtain service information of a plurality of services that are not repeated.

It is worthwhile to note that de-duplication is only one of objectives that can be achieved through the previously described integration and/or filtering, and more objectives can be further achieved.

For example, through the previously described integration and/or filtering, a visualization template that includes the service information of the plurality of services that are not repeated can be obtained, or the service information of the plurality of services that are not repeated and template indication information (which can be represented in a form of a character string JSON, a character string XML string, etc.) can be obtained. Correspondingly, the returning the service information to the client device in step S203 can include the following: returning the visualization template that includes the service information of the plurality of services that are not repeated to the client device, or returning the service information of the plurality of services that are not repeated and the template indication information to the client device.

For another example, service information with a higher priority can be selected based on a certain service information priority policy and then preferably returned.

In this implementation of the present application, after the returning the service information to the client device in step S203, the procedure can further include the following: detecting, by the server, the current scenario information of the client device; and when determining that the detected current scenario information cannot successfully match the successfully matched scenario content information (it can be considered that the user has left the previous scenario), sending corresponding indication information to the client device, so that the client device deletes or hides the displayed visualization template that includes the service information corresponding to the successfully matched scenario content information. The detection-related actions can be implemented by performing the procedure in FIG. 2 again, or can be implemented by using logical procedures other than the procedure in FIG. 2.

The indication information can be service information returned by the server again, or can be information that does not include service information, but merely instructs the client device to delete or hide the service information.

Figure 3:
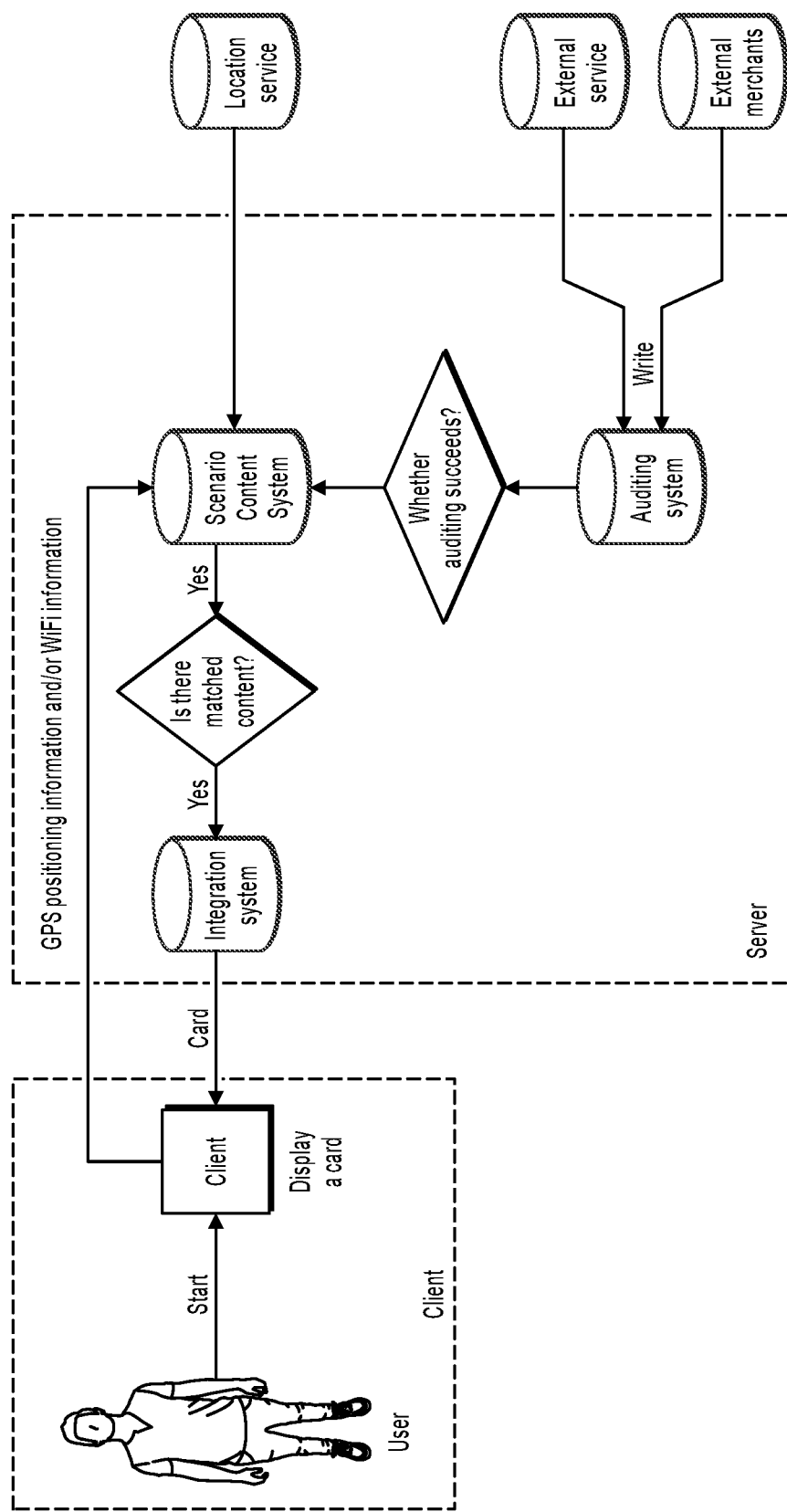
FIG. 3 is a schematic principle diagram illustrating a specific implementation solution of the previously described information presentation method in an actual application scenario, according to an implementation of the present application.

The information presentation method provided in the implementations of the present application is described above separately from a perspective of a client device and from a perspective of a server. For ease of understanding, an implementation of the present application further provides a schematic principle diagram illustrating a specific implementation solution of the previously described information presentation method in an actual application scenario, according to an implementation of the present application, which is shown in FIG. 3.

In the actual application scenario, the client device is located on a mobile phone. The client device sends a service information obtaining request that carries current scenario information (which is assumed to be GPS positioning information and/or Wi-Fi information) of the client device to a scenario content system on a server side each time a user starts the client device.

An auditing system on the server side pre-obtains service information of services and corresponding scenario content information (which is assumed to be geographical location information) from a plurality of predetermined service providers (which are assumed to be external service providers, external merchants, etc.), mechanically or manually audits the information, and sends audited information to the scenario content system for storage.

After receiving the service information obtaining request, the scenario content system parses the GPS positioning information and/or the Wi-Fi information carried in the request by using a location service, to obtain corresponding geographical location information, matches the geographical location information against stored scenario content information, and sends at least a part of service information corresponding to the matched scenario content information to an integration system on the server side.

The integration system integrates the service information, to generate a character string JSON (which is equivalent to a "card" to be displayed) that includes template indication information and service information of a plurality of services, and returns the character string JSON to the client device.

The client device displays a corresponding card in a specified interface based on the received character string JSON.

Figure 4:
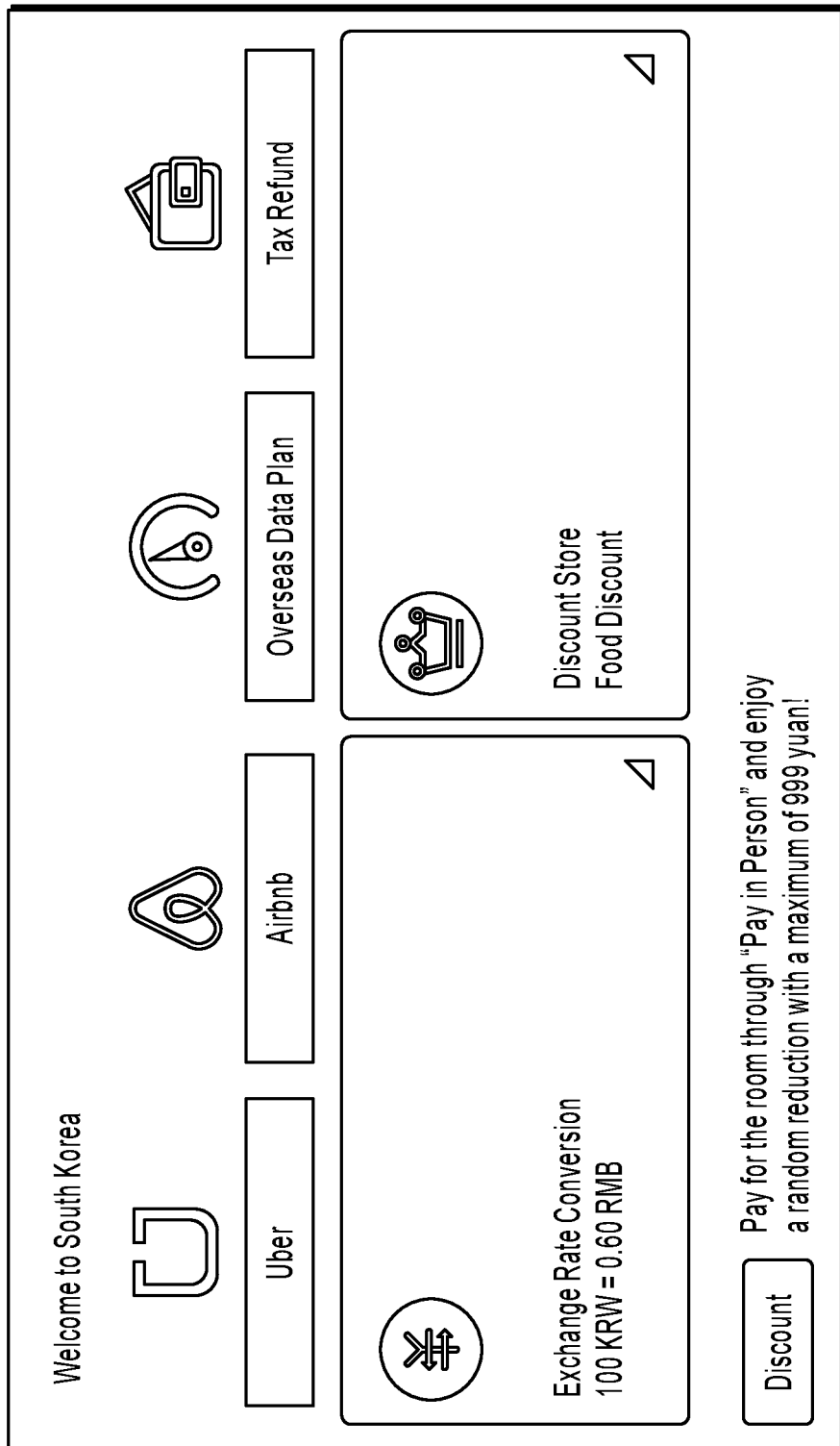
FIG. 4 is a schematic diagram illustrating a card displayed on a client device in the scenario shown in FIG. 3, according to an implementation of the present application.
Figure 5:
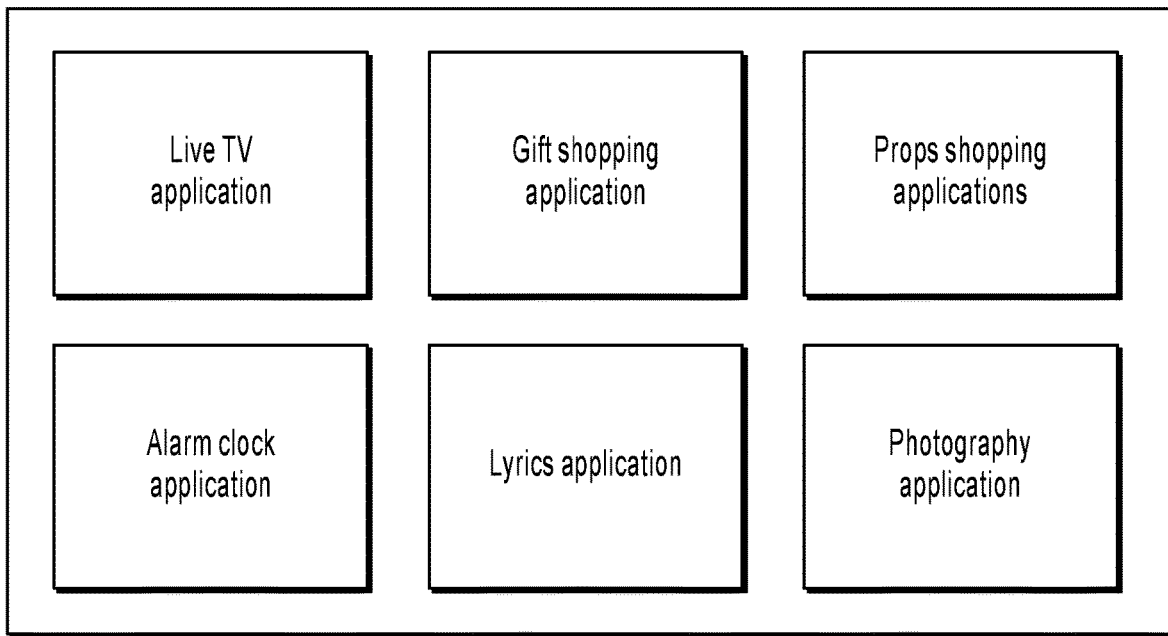
FIG. 5 is a schematic diagram illustrating another card displayed on a client device in the scenario shown in FIG. 3, according to an implementation of the present application.

Further, implementations of the present application further provide schematic diagrams illustrating two cards displayed on a client device in the scenario shown in FIG. 3, which are shown in FIG. 4 and FIG. 5.

FIG. 4 is a schematic diagram illustrating a card displayed on a client device in the scenario shown in FIG. 3, according to an implementation of the present application. The card can be obtained based on information that is sent by the client device to a server and that can reflect an environment that the client device is located in, for example, GPS positioning information and/or Wifi information.

Assume that a certain Chinese user travels to Korea on business, when the user is in Korea and turns on the previously described client on a mobile phone for the first time, the client device displays a card by interacting with the server. The card can be shown in FIG. 4. It can be seen that the card includes service information of seven services that the user possibly needs to use in South Korea, namely, "Uber" (corresponding to a taxi hailing application that can be used in a plurality of countries), "Airbnb" (corresponding to a hotel reservation application that can be used to reserve hotels in a plurality of countries), "Overseas Data Plan" (corresponding to an international data plan service provided by a certain mobile telecommunication company), "Tax Refund" (corresponding to a tax refund information service in South Korea), "Exchange Rate Conversion" (corresponding to at least an exchange rate service between RMB and KRW), "Discount Store" (corresponding to at least a shopping service in South Korea), and "Pay in Person" (corresponding to at least an international electronic payment service).

The service information "Exchange Rate Conversion" is an application interface of an application, and the user can directly see from the card that a current exchange rate is "0.6 RMB for 100 KRW". The other service information can be access entry information of an application. The user can open a corresponding application interface by clicking the service information, and then obtain a corresponding service.

After the user leaves South Korea, the client device can delete the card in FIG. 4, and then display another card suitable for a scenario.

FIG. 5 is a schematic diagram illustrating another card displayed on a client device in the scenario shown in FIG. 3, according to an implementation of the present application. The card can be obtained based on information that is sent by the client device to a server and that reflects an operation performed on a device that the client device is located in, for example, application usage information.

Assume that the application usage information reflects that a user has just purchased a ticket for a certain concert by using a network ticket application on the device that the client device is located in, when the user turns on the client device for the first time, the client device displays a card by interacting with the server. The card can be shown in FIG. 5. It can be seen that the card includes service information of six services that the user possibly needs to use after purchasing the ticket for the concert, namely, "live TV application" (the user possibly broadcasts the concert), "gift shopping application" (the user possibly purchases gifts for the singer in the concert or accompanying friends), "props shopping application" (the user possibly purchases props used to give a cheer to the singer in the concert), "alarm clock application" (the user possibly sets the alarm clock for some important time before the concert), "lyrics application" (the user possibly needs to query lyrics when singing along in the concert), and "photography application" (the user possibly needs to take photos in the concert).

After the concert ends, the client device can delete the card in FIG. 5 and then display another card suitable for a scenario.

It is worthwhile to note that specific styles of the cards in FIG. 4 and FIG. 5 and service information included in the cards are merely examples, and do not constitute a limitation on the present application.

Figure 6:
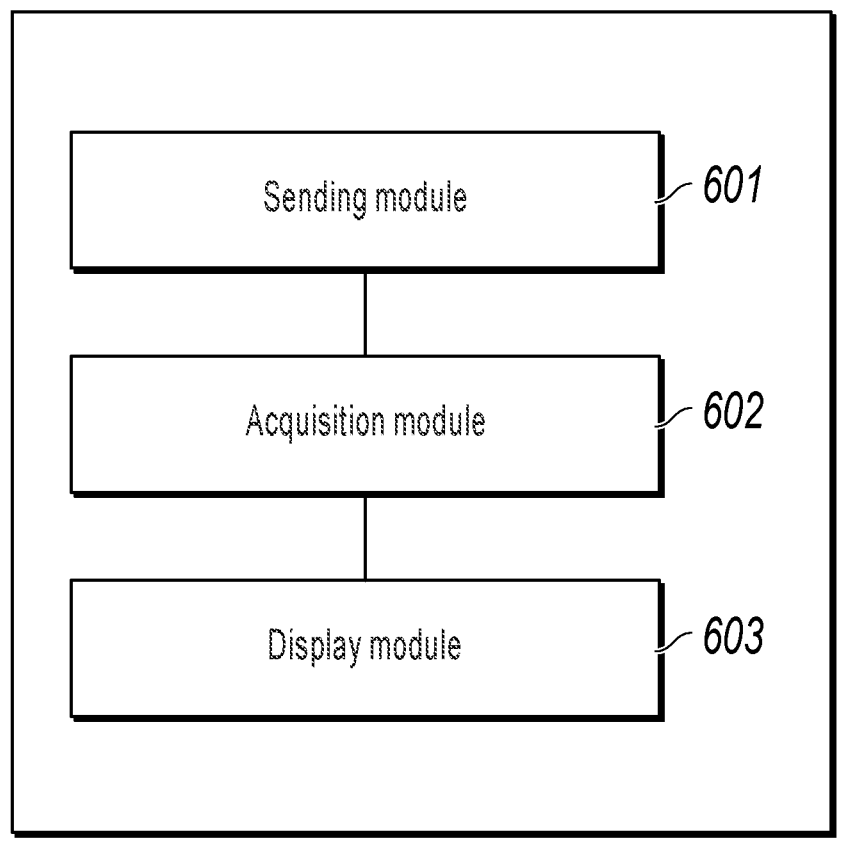
FIG. 6 is a schematic structural diagram illustrating an information presentation apparatus that corresponds to FIG. 1, according to an implementation of the present application.
Figure 7:
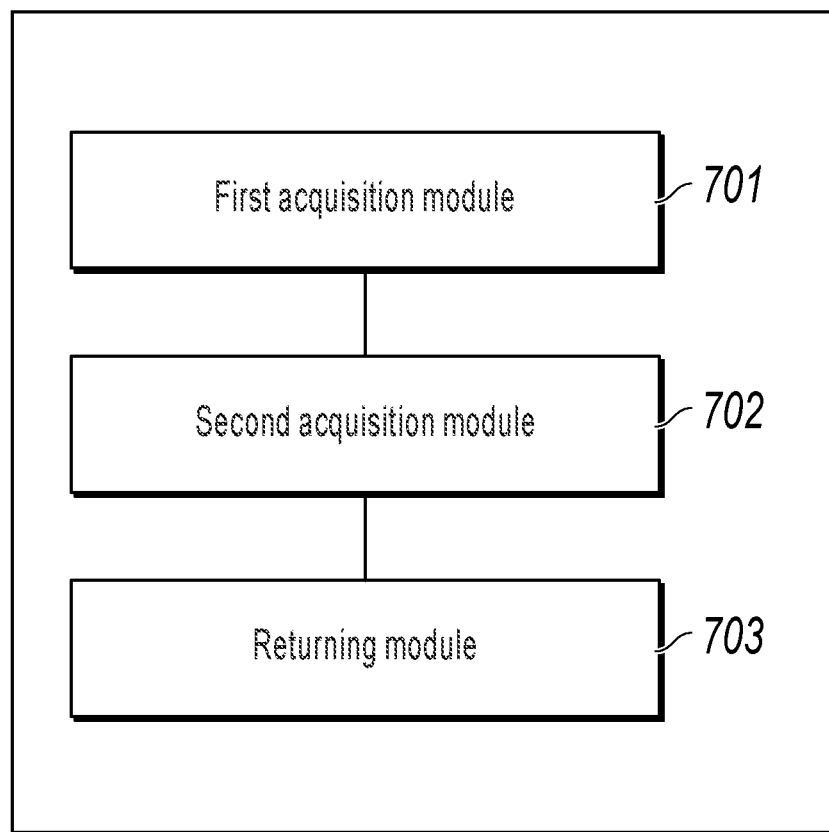
FIG. 7 is a schematic structural diagram illustrating an information presentation apparatus that corresponds to FIG. 2, according to an implementation of the present application.

Further, an implementation of the present application further provides an apparatus corresponding to the previously described information presentation method, which is shown in FIG. 6 and FIG. 7.

FIG. 6 is a schematic structural diagram illustrating an information presentation apparatus that corresponds to FIG. 1, according to an implementation of the present application. The apparatus can be located on an execution body (for example, a client device) of the procedure in FIG. 1, and includes the following: a sending module 601, configured to send current scenario information of the client device to a server; an acquisition module 602, configured to obtain service information of a plurality of services returned by the server, where the service information is obtained by the server by matching the current scenario information; and a display module 603, configured to display the service information in a specified interface by using a visualization template; where the service information includes access entry information of an application and/or an application interface of an application.

Optionally, that a sending module 601 sends current scenario information of the client device to a server includes the following: the sending module 601 sends the current scenario information of the client device to the server when the client device is started or a specified interface is refreshed.

Optionally, the current scenario information includes information reflecting an environment that the client device is located in and/or information reflecting an operation performed on a device that the client device is located in.

Optionally, the information reflecting the environment that the client device is located in includes global positioning system (GPS) positioning information of the device that the client device is located in, and/or information about Wireless Fidelity (WiFi) connected to the device that the client device is located in; and the service information is obtained by the server by matching the information reflecting the environment that the client device is located in against predetermined geographical location information, and the service information corresponds to successfully matched geographical location information.

Optionally, before the display module 603 displays the service information in the specified interface by using the visualization template, the acquisition module 602 obtains template indication information returned by the server; and that a display module 603 displays the service information in a specified interface by using a visualization template includes the following: the display module 603 displays the service information in the specified interface by using a visualization template indicated by the template indication information.

Optionally, that a display module 603 displays the service information in a specified interface by using a visualization template includes the following: the display module 603 adds the service information to a same visualization template, and displays a visualization template that includes the service information in the specified interface.

Optionally, when the service information includes the access entry information of the application, after the display module 603 displays the service information in the specified interface by using the visualization template, when a specified operation performed on the displayed visualization template that includes the access entry information of the application is detected, the display module 603 displays an application interface of an application corresponding to the service information, or invokes another client, so that the another client displays the application interface of the application corresponding to the service information.

Optionally, the service information corresponds to scenario content information on the server that is successfully matched with the current scenario information; and after the display module 603 displays the service information in the specified interface by using the visualization template, when it is determined that the current scenario information of the client device is no longer successfully matched with the successfully matched scenario content information, the display module 603 deletes or hides the displayed visualization template that includes the service information.

Optionally, the visualization template includes a card-style template.

FIG. 7 is a schematic structural diagram illustrating an information presentation apparatus that corresponds to FIG. 2, according to an implementation of the present application. The apparatus can be located on an execution body (for example, a server) of the procedure in FIG. 2, and includes the following: a first acquisition module 701, configured to obtain current scenario information of a client device; a second acquisition module 702, configured to obtain service information of a plurality of services by matching the current scenario information; and a returning module 703, configured to return the service information to the client device, so that the client device displays the service information in a specified interface by using a visualization template; where the service information includes access entry information of an application and/or an application interface of an application.

Optionally, the current scenario information includes information reflecting an environment that the client device is located in and/or information reflecting an operation performed on a device that the client device is located in.

Optionally, that a second acquisition module 702 obtains service information of a plurality of services by matching the current scenario information includes the following: the second acquisition module 702 matches the current scenario information against predetermined scenario content information, to determine successfully matched scenario content information; and obtains the service information of the plurality of services that corresponds to the successfully matched scenario content information.

Optionally, the information reflecting the environment that the client device is located in includes global positioning system (GPS) positioning information of the device that the client device is located in, and/or information about Wireless Fidelity (WiFi) connected to the device that the client device is located in; and the scenario content information is geographical location information.

Optionally, before obtaining the service information of the plurality of services by matching the current scenario information, the second acquisition module 702 obtains, by using a predetermined interface, the following information sent by each predetermined service provider: service information of a service that can be provided by the service provider and geographical location information corresponding to the service information, where the obtained geographical location information is used as scenario content information corresponding to the service information.

Optionally, the returning module 703 further returns template indication information to the client device, so that the client device displays the service information in the specified interface by using a visualization template indicated by the template indication information.

Optionally, that the second acquisition module 702 obtains the service information of the plurality of services that corresponds to the successfully matched scenario content information includes the following: the second acquisition module 702 obtains service information of at least some of all services corresponding to the successfully matched scenario content information; and performs, based on a predetermined integration rule and/or filtering rule, integration and/or filtering on the service information of the at least some services corresponding to the successfully matched scenario content information, to obtain service information of a plurality of services that are not repeated.

Optionally, that the second acquisition module 702 performs integration and/or filtering on the service information of the at least some services corresponding to the successfully matched scenario content information, to obtain service information of a plurality of services that are not repeated includes the following: the second acquisition module 702 performs integration and/or filtering on the service information of the at least some services corresponding to the successfully matched scenario content information, to obtain the service information of the plurality of services that are not repeated and template indication information; and that a returning module 703 returns the service information to the client device includes the following: the returning module 703 returns the service information of the plurality of services that are not repeated and the template indication information to the client device.

Optionally, after returning the service information to the client device, the returning module 703 detects the current scenario information of the client device; and when determining that the detected current scenario information cannot successfully match the successfully matched scenario content information, sends corresponding indication information to the client device, so that the client device deletes or hides the displayed visualization template that includes the service information corresponding to the successfully matched scenario content information.

Optionally, the visualization template includes a card-style template.

The apparatus and the method provided in the implementations of the present application are in a one-to-one correspondence. Therefore, the apparatus also have beneficial technical effects similar to those of the method. Because the beneficial technical effects of the method have been described in detail, the beneficial technical effects of the corresponding apparatus are omitted here.

In the 1990s, improvement of a technology can be distinguished between hardware improvement (for example, improvement on a circuit structure such as a diode, a transistor, or a switch) and software improvement (improvement on a method procedure). However, with the development of technologies, improvement of many method procedures can be considered as direct improvement of a hardware circuit structure. Designers almost all program an improved method procedure to a hardware circuit, to obtain a corresponding hardware circuit structure. Therefore, it cannot be said that improvement of a method procedure cannot be implemented by using a hardware entity module. For example, a programmable logic device (PLD) (for example, a field programmable gate array (FPGA)) is such an integrated circuit. A logical function of the programmable logic device is determined by component programming executed by a user. The designers perform voluntary programming to "integrate" a digital system into a single PLD without requiring a chip manufacturer to design and produce a dedicated integrated circuit chip. In addition, instead of manually producing an integrated circuit chip, the programming is mostly implemented by "logic compiler" software, which is similar to a software compiler used during program development. Original code before compiling is also written in a specific programming language, which is referred to as a hardware description language (HDL), and there is more than one type of HDL, such as ABEL (Advanced Boolean Expression Language), an AHDL (Altera Hardware Description Language), Confluence, CUPL (Cornell University Programming Language), an HDCal, JHDL (Java Hardware Description Language), a Lava, Lola, a MyHDL, PALASM, and an RHDL (Ruby Hardware Description Language), etc. Currently, VHDL (Very-High-Speed Integrated Circuit Hardware Description Language) and Verilog are most commonly used. A person skilled in the art should also understand that a method procedure only needs to be logically programmed, and programmed to the integrated circuit by using the previous hardware description languages so that a hardware circuit that implements the logical method procedure can be easily obtained.

A controller can be implemented by using any appropriate method. For example, the controller can be a microprocessor or a processor, or a computer-readable medium, a logic gate, a switch, an application-specific integrated circuit (ASIC), a programmable logic controller, or an embedded microprocessor that stores computer readable program code (such as software or firmware) that can be executed by the microprocessor or the processor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that a controller can be implemented by using pure computer-readable program code, and the steps in the method can be logically programmed to enable the controller to further implement same functions in forms of a logic gate, a switch, an application-specific integrated circuit, a programmable logic controller, an embedded microcontroller, etc. Therefore, the controller can be considered as a hardware component, and an apparatus that is included in the controller and that is configured to implement various functions can also be considered as a structure in the hardware component. Alternatively, an apparatus configured to implement various functions can be considered as both a software module for implementing the method and a structure in the hardware component.

The system, apparatus, module, or unit described in the described implementations can be implemented by a computer chip or an entity, or implemented by a product with a certain function. A typical implementation device is a computer. The computer can be, for example, a personal computer, a laptop computer, a cellular phone, a camera phone, a smartphone, a personal digital assistant, a media player, a navigation device, an email device, a game console, a tablet computer, or a wearable device, or a combination of any of these devices.

For ease of description, the described apparatus is described by dividing functions into various units. Certainly, when the present application is implemented, the functions of the units can be implemented in one or more pieces of software and/or hardware.

A person skilled in the art should understand that the implementations of the present disclosure can be provided as a method, a system, or a computer program product. Therefore, the present disclosure can use a form of hardware only implementations, software only implementations, or implementations with a combination of software and hardware. In addition, the present disclosure can use a form of a computer program product that is implemented on one or more computer-usable storage media (including but not limited to a disk memory, a CD-ROM, and an optical memory) that include computer-usable program code.

The present disclosure is described with reference to the flowcharts and/or block diagrams of the method, the device (system), and the computer program product according to the implementations of the present disclosure. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of any other programmable data processing device to generate a machine so that the instructions executed by a computer or a processor of any other programmable data processing device generate an apparatus for implementing a specific function in one or more processes in the flowcharts or in one or more blocks in the block diagrams.

These computer program instructions can be stored in a computer readable memory that can instruct the computer or any other programmable data processing device to work in a specific method, so that the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded to a computer or another programmable data processing device, so that a series of operations and steps are performed on the computer or the another programmable device, generating computer-implemented processing. Therefore, the instructions executed on the computer or the another programmable device provide steps for implementing a specific function in one or more processes in the flowcharts or in one or more blocks in the block diagrams.

In a typical configuration, the computing device includes one or more processors (CPU), one or more input/output interface, one or more network interface, and one or more memory.

The memory can include a non-persistent memory, a random access memory (RAM) and/or a nonvolatile memory in a computer readable medium, for example, a read-only memory (ROM) or a flash memory (flash RAM).

The computer readable medium includes persistent, non-persistent, movable, and unmovable media that can implement information storage by using any method or technology. Information can be a computer readable instruction, a data structure, a program module, or other data. A computer storage medium includes but is not limited to a parameter random access memory (PRAM), a static random access memory (SRAM), a dynamic random access memory (DRAM), a random access memory (RAM) of another type, a read-only memory (ROM), an electrically erasable programmable read-only memory (EEPROM), a flash memory or another memory technology, a compact disc read-only memory (CD-ROM), a digital versatile disc (DVD) or another optical storage, a magnetic tape, a magnetic disk storage, another magnetic storage device, or any other non-transmission media that can be used to store information that can be accessed by the computing device. Based on the definition in the present specification, the computer readable medium does not include transitory computer readable medium (transitory media), for example, a modulated data signal and carrier.

It is worthwhile to further note that the term "include", "contain", or their any other variant is intended to cover a non-exclusive inclusion, so that a process, a method, merchandise, or a device that includes a list of elements not only includes those elements but also includes other elements which are not expressly listed, or further includes elements inherent to such process, method, merchandise, or device. An element preceded by "includes a . . . " does not, without more constraints, preclude the existence of additional identical elements in the process, method, merchandise, or device that includes the element.

A person skilled in the art should understand that the implementations of the present application can be provided as a method, a system, or a computer program product. Therefore, the present application can use a form of hardware only implementations, software only implementations, or implementations with a combination of software and hardware. In addition, the present application can use a form of a computer program product that is implemented on one or more computer-usable storage media (including but not limited to a disk memory, a CD-ROM, and an optical memory) that include computer-usable program code.

The present application can be described in the general context of computer executable instructions executed by a computer, for example, a program module. Generally, the program module includes a routine, a program, an object, a component, a data structure, etc. for executing a specific task or implementing a specific abstract data type. The present application can also be practiced in distributed computing environments. In the distributed computing environments, tasks are performed by remote processing devices connected through a communications network. In a distributed computing environment, the program module can be located in both local and remote computer storage media including storage devices.

The implementations in the present specification are all described in a progressive way. For the same or similar parts of the implementations, refer to the implementations. Each implementation focuses on a difference from other implementations. Particularly, a system implementation is basically similar to a method implementation, and therefore is described briefly. For related parts, refer to partial descriptions of the method implementation.

The previous descriptions are merely implementations of the present application, and are not intended to limit the present application. A person skilled in the art can make various modifications and changes to the present application. Any modification, equivalent replacement, improvement, etc. made within the spirit and principle of the present application shall fall within the scope of the claims of the present application.

Figure 8:
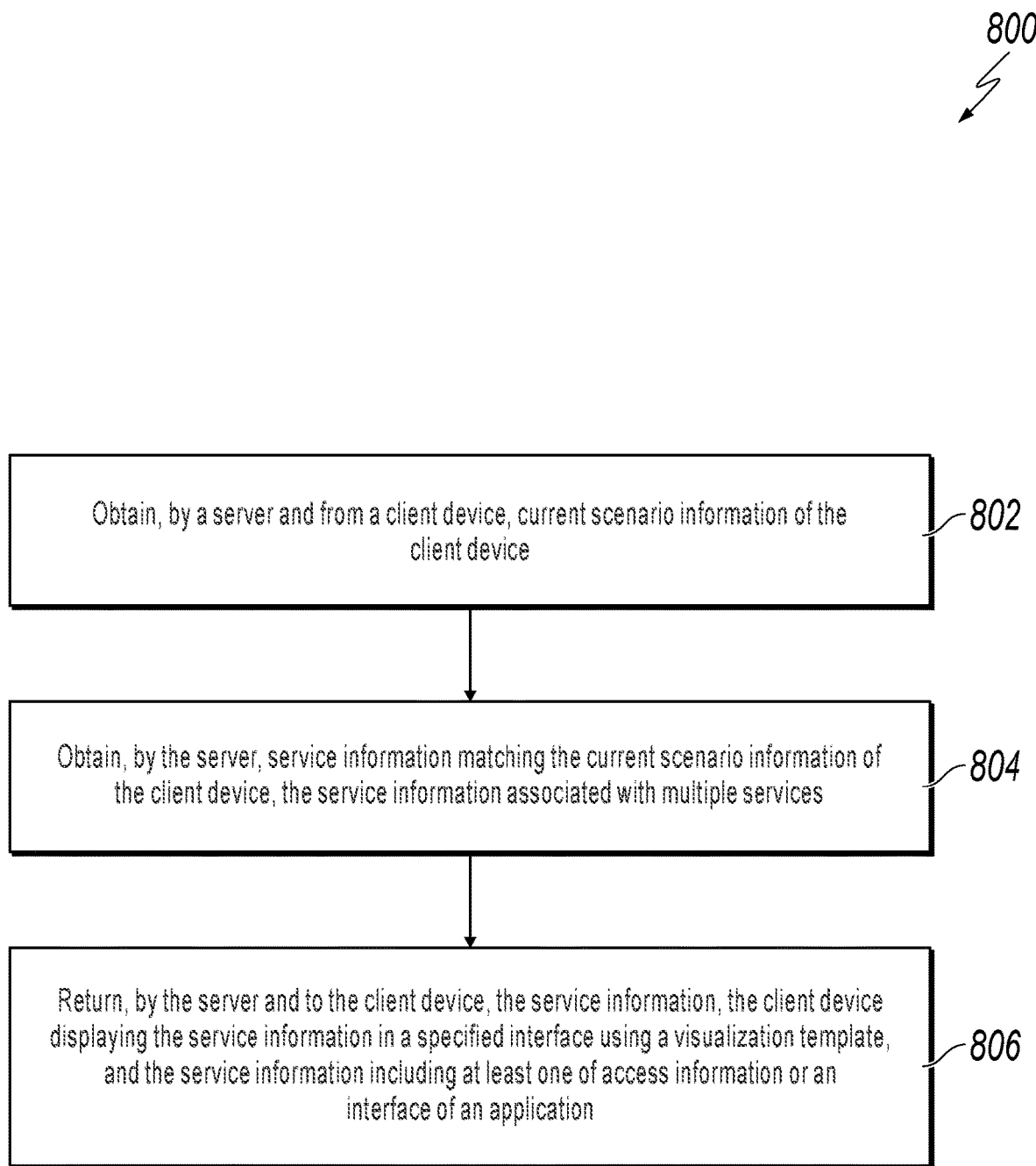
FIG. 8 is a flowchart illustrating an example of a computer-implemented method for providing service information, according to an implementation of the present disclosure.

FIG. 8 is a flowchart illustrating an example of a computer-implemented method 800 for providing service information, according to an implementation of the present disclosure. For clarity of presentation, the description that follows generally describes method 800 in the context of the other figures in this description. However, it will be understood that method 800 can be performed, for example, by any system, environment, software, and hardware, or a combination of systems, environments, software, and hardware, as appropriate. In some implementations, various steps of method 800 can be run in parallel, in combination, in loops, or in any order.

At 802, a server obtains, from a client device, current scenario information of the client device. For example, the client device can automatically transmit the current scenario information to the server once a communication link is established between the server and the client device. In some implementations, the current scenario information of the client device includes at least one of information reflecting an environment that the client device is located in or information reflecting an operation performed on the client device. For example, the information reflecting the environment that the client device is located in includes at least one of global positioning system (GPS) positioning information of the client device or Wireless Fidelity (WiFi) information of the client device. The information reflecting the operation performed on the client device includes at least one of usage information or setting information of an application on the client device. From 802, method 800 proceeds to 804.

At 804, the server obtains service information matching the current scenario information of the client device. In some implementations, the service information is associated with multiple services. For example, after obtaining the current scenario information of the client device, the server can automatically compare the current scenario information of the client device with multiple predetermined scenario content information. Scenario content information matching the current scenario information of the client device can be automatically determined from the multiple predetermined scenario content information. In some implementations, the scenario content information can be geographical location information. The service information associated with the multiple services that corresponds to the scenario content information can be automatically obtained. For example, service information of at least two services of all services corresponding to the scenario content information can be obtained by the server. At least one of integration or filtering can be automatically performed, by the server, on the service information of at least two services of all services corresponding to the scenario content information to obtain the service information associated with the multiple services based on at least one of a predetermined integration rule or a predetermined filtering rule. In some implementations, the multiple services do not include any repeated service. For example, no two services in the multiple services are the same service.

In some implementations, at least one of integration or filtering can be performed on the service information of at least two services of all services corresponding to the scenario content information to obtain the service information associated with the multiple services that are not repeated services and template indication information.

In some implementations, before obtaining service information matching the current scenario information of the client device, the server can obtain, from each predetermined service provider using, for example, a predetermined interface, service information of a service that can be provided by the particular service provider and geographical location information corresponding to the service information of the service that can be provided by the particular service provider. The obtained geographical location information corresponding to the service information of the service that can be provided by the particular service provider can be used as scenario content information corresponding to the service information of the service that can be provided by the particular service provider. From 804, method 800 proceeds to 806.

At 806, the server returns, to the client device, the service information. The client device can automatically display the service information in a specified interface using a visualization template. In some implementations, the visualization template includes a card-style template. For example, the client device can display a single card corresponding to the current scenario information. The displayed card can include the multiple services. In some implementations, the service information includes at least one of access information or an interface of an application. In some implementations, returning the service information includes returning the service information associated with the multiple services that are not repeated services and the template indication information to the client device.

In some implementations, after returning the service information to the client device, the server can obtain, from the client device, second current scenario information of the client device. In response to determining that the second current scenario information does not match the scenario content information, the server can send indication information to the client device. The indication information instructs the client device to delete or hide the visualization template.

In some implementations, after returning the service information to the client device, the server can return, to the client device, template indication information. The client device can display the service information in the specified interface using the visualization template indicated by the template indication information. After 806, method 800 can stop.

A user can use a mobile device to obtain a service. Normally, the user may search for an application icon on the mobile device when the user wants to use the service. A recommended service can be provided to the user. However, the recommended service may not be the service the user is looking for, and may interfere with the user. The subject matter described in this specification provides accurate service information to a user. For example, service information is presented to the user based on current scenario information of a client device. The service information can include multiple services instead of a single service. As a result, accuracy of recommended services can be improved, thereby improving service information providing efficiency and user experience.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
   obtaining, by a server and from a client device, current scenario information of the client device, wherein the current scenario information of the client device comprises at least one of weather information reflecting an environment that the client device is located in or information reflecting an operation performed on the client device, and wherein the server obtains the current scenario information of the client device from the client device in response to determining that the client device is started or a specified interface of the client device is refreshed;
   obtaining, by the server, service information matching the current scenario information of the client device, wherein the service information is associated with a plurality of services; and
   returning, by the server and to the client device, the service information and template indication information, wherein the service information and the template indication information are returned to the client device in a character string comprising a plurality of predetermined fields and corresponding field values, wherein the template indication information indicates a visualization template to display the service information in the specified interface, and wherein the service information includes at least one of access information or an interface of an application.

2. The computer-implemented method of claim 1, wherein obtaining service information matching the current scenario information of the client device comprises:
   comparing the current scenario information of the client device with a plurality of predetermined scenario content information;
   determining, from the plurality of predetermined scenario content information, scenario content information matching the current scenario information of the client device; and
   obtaining the service information associated with the plurality of services that corresponds to the scenario content information.

3. The computer-implemented method of claim 2, wherein after returning the service information to the client device, the method further comprises:
   obtaining, by the server and from the client device, second current scenario information of the client device; and
   in response to determining that the second current scenario information does not match the scenario content information, sending, by the server, indication information to the client device, wherein the indication information instructs the client device to delete or hide the visualization template.

4. The computer-implemented method of claim 2, wherein before obtaining service information matching the current scenario information of the client device, the method further comprises:
   obtaining, by the server and from each predetermined service provider using a predetermined interface, service information of a service that can be provided by a particular service provider and geographical location information corresponding to the service information of the service that can be provided by the particular service provider, wherein the geographical location information corresponding to the service information of the service that can be provided by the particular service provider is used as scenario content information corresponding to the service information of the service that can be provided by the particular service provider.

5. The computer-implemented method of claim 2, wherein obtaining the service information associated with the plurality of services that corresponds to the scenario content information comprises:
   obtaining service information of at least two services of all services corresponding to the scenario content information; and
   performing at least one of integration or filtering on the service information of at least two services of all services corresponding to the scenario content information to obtain the service information associated with the plurality of services based on at least one of a predetermined integration rule or a predetermined filtering rule, wherein the plurality of services do not include any repeated service.

6. The computer-implemented method of claim 5, wherein performing at least one of integration or filtering on the service information of at least two services of all services corresponding to the scenario content information comprises:
   performing at least one of integration or filtering on the service information of at least two services of all services corresponding to the scenario content information to obtain the service information associated with the plurality of services that are not repeated services and the template indication information; and
   wherein returning the service information comprises returning the service information associated with the plurality of services that are not repeated services and the template indication information to the client device.

7. The computer-implemented method of claim 1, wherein the character string includes a JavaScript Object Notation (JSON) string or an extensible markup language (XML) string.

8. A non-transitory, computer-readable medium storing one or more instructions executable by a computer system to perform operations comprising:
   obtaining, by a server and from a client device, current scenario information of the client device, wherein the current scenario information of the client device comprises at least one of weather information reflecting an environment that the client device is located in or information reflecting an operation performed on the client device, and wherein the server obtains the current scenario information of the client device from the client device in response to determining that the client device is started or a specified interface of the client device is refreshed;

obtaining, by the server, service information matching the current scenario information of the client device, wherein the service information is associated with a plurality of services; and returning, by the server and to the client device, the service information and template indication information, wherein the service information and the template indication information are returned to the client device a character string comprising a plurality of predetermined fields and corresponding field values, wherein the template indication information indicates a visualization template to display the service information in the specified interface, and wherein the service information includes at least one of access information or an interface of an application.

9. The non-transitory, computer-readable medium of claim 8, wherein obtaining service information matching the current scenario information of the client device comprises:

comparing the current scenario information of the client device with a plurality of predetermined scenario content information;

determining, from the plurality of predetermined scenario content information, scenario content information matching the current scenario information of the client device; and obtaining the service information associated with the plurality of services that corresponds to the scenario content information.

10. The non-transitory, computer-readable medium of claim 9, wherein after returning the service information to the client device, the operations further comprise:

obtaining, by the server and from the client device, second current scenario information of the client device; and in response to determining that the second current scenario information does not match the scenario content information, sending, by the server, indication information to the client device, wherein the indication information instructs the client device to delete or hide the visualization template.

11. The non-transitory, computer-readable medium of claim 9, wherein before obtaining service information matching the current scenario information of the client device, the operations further comprise:

obtaining, by the server and from each predetermined service provider using a predetermined interface, service information of a service that can be provided by a particular service provider and geographical location information corresponding to the service information of the service that can be provided by the particular service provider, wherein the geographical location information corresponding to the service information of the service that can be provided by the particular service provider is used as scenario content information corresponding to the service information of the service that can be provided by the particular service provider.

12. The non-transitory, computer-readable medium of claim 9, wherein obtaining the service information associated with the plurality of services that corresponds to the scenario content information comprises:

obtaining service information of at least two services of all services corresponding to the scenario content information; and performing at least one of integration or filtering on the service information of at least two services of all services corresponding to the scenario content information to obtain the service information associated with the plurality of services based on at least one of a predetermined integration rule or a predetermined filtering rule, wherein the plurality of services do not include any repeated service.

13. The non-transitory, computer-readable medium of claim 12, wherein performing at least one of integration or filtering on the service information of at least two services of all services corresponding to the scenario content information comprises:

performing at least one of integration or filtering on the service information of at least two services of all services corresponding to the scenario content information to obtain the service information associated with the plurality of services that are not repeated services and the template indication information; and wherein returning the service information comprises returning the service information associated with the plurality of services that are not repeated services and the template indication information to the client device.

14. The non-transitory, computer-readable medium of claim 8, wherein the character string includes a JavaScript Object Notation (JSON) string or an extensible markup language (XML) string.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:

obtaining, by a server and from a client device, current scenario information of the client device, wherein the current scenario information of the client device comprises at least one of weather information reflecting an environment that the client device is located in or information reflecting an operation performed on the client device, and wherein the server obtains the current scenario information of the client device from the client device in response to determining that the client device is started or a specified interface of the client device is refreshed;

obtaining, by the server, service information matching the current scenario information of the client device, wherein the service information is associated with a plurality of services; and returning, by the server and to the client device, the service information and template indication information, wherein the service information and the template indication information are returned to the client device a character string comprising a plurality of predetermined fields and corresponding field values, wherein the template indication information indicates a visualization template to display the service information in the specified interface, and wherein the service information includes at least one of access information or an interface of an application.

16. The computer-implemented system of claim 15, wherein obtaining service information matching the current scenario information of the client device comprises:

comparing the current scenario information of the client device with a plurality of predetermined scenario content information;

determining, from the plurality of predetermined scenario content information, scenario content information matching the current scenario information of the client device; and obtaining the service information associated with the plurality of services that corresponds to the scenario content information.

17. The computer-implemented system of claim 16, wherein after returning the service information to the client device, the one or more operations further comprise:

obtaining, by the server and from the client device, second current scenario information of the client device; and in response to determining that the second current scenario information does not match the scenario content information, sending, by the server, indication information to the client device, wherein the indication information instructs the client device to delete or hide the visualization template.

18. The computer-implemented system of claim 16, wherein before obtaining service information matching the current scenario information of the client device, the one or more operations further comprise:

obtaining, by the server and from each predetermined service provider using a predetermined interface, service information of a service that can be provided by a particular service provider and geographical location information corresponding to the service information of the service that can be provided by the particular service provider, wherein the geographical location information corresponding to the service information of the service that can be provided by the particular service provider is used as scenario content information corresponding to the service information of the service that can be provided by the particular service provider.

19. The computer-implemented system of claim 16, wherein obtaining the service information associated with the plurality of services that corresponds to the scenario content information comprises:

obtaining service information of at least two services of all services corresponding to the scenario content information; and performing at least one of integration or filtering on the service information of at least two services of all services corresponding to the scenario content information to obtain the service information associated with the plurality of services based on at least one of a predetermined integration rule or a predetermined filtering rule, wherein the plurality of services do not include any repeated service.

20. The computer-implemented method of claim 1, wherein the visualization template includes at least one of a card-style visualization template, an icon-style visualization template, or a three-dimensional graph-style visualization template, and wherein each visualization template style includes at least one of a size, a shape, a color, a texture, a shadow, or a pattern.

* * * * *